United States Patent
Shafer

[11] 3,907,072
[45] Sept. 23, 1975

[54] CHOCK-LOCK BLOCK
[75] Inventor: Kenneth A. Shafer, Hohokus, N.J.
[73] Assignee: Lawrence Peska Associates, Inc., New York, N.Y. ; a part interest
[22] Filed: Aug. 22, 1974
[21] Appl. No.: 499,510

[52] U.S. Cl. .................................... 188/32; 70/226
[51] Int. Cl.² ............................................ B60T 3/00
[58] Field of Search ...................... 70/15, 225–228, 70/234, 259, 260; 188/4 R, 32, 36

[56] References Cited
UNITED STATES PATENTS

| | | |
|---|---|---|
| 584,017 | 6/1897 | Sewell .................................. 70/226 |
| 1,317,329 | 9/1919 | Shorday ............................ 188/32 X |
| 1,370,364 | 3/1921 | Rodriquez ...................... 188/32 UX |
| 1,376,114 | 4/1921 | Raney ............................ 188/32 UX |
| 1,445,071 | 2/1923 | Collins ................................ 188/32 |

Primary Examiner—Duane A. Reger

[57] ABSTRACT

A chock block has a pair of arms for engaging a tire, one of the arms being adjustable so that any size tire can be engaged. This arm is lockable, thereby making theft of the transport difficult.

9 Claims, 2 Drawing Figures

CHOCK-LOCK BLOCK

The present invention relates to a device for immobilizing transports, and more particularly it is for mobile homes and trailers.

The typical prior art immobilizing device for trailers is a lock for the ball receiver. Unfortunately, a thief can still use chains to tow the trailer away.

It is therefore an object of the present invention to provide an improved locking means for transports.

In brief, this and other objects are achieved by having a chock block that has a surface that engages a tire. A pair of arms grip the tire to securely hold the block to the tire. A lock locks the arms.

These and other objects, features, and advantages will become apparent from the description when taken in conjunction with the following drawings in which.

Figure 1:
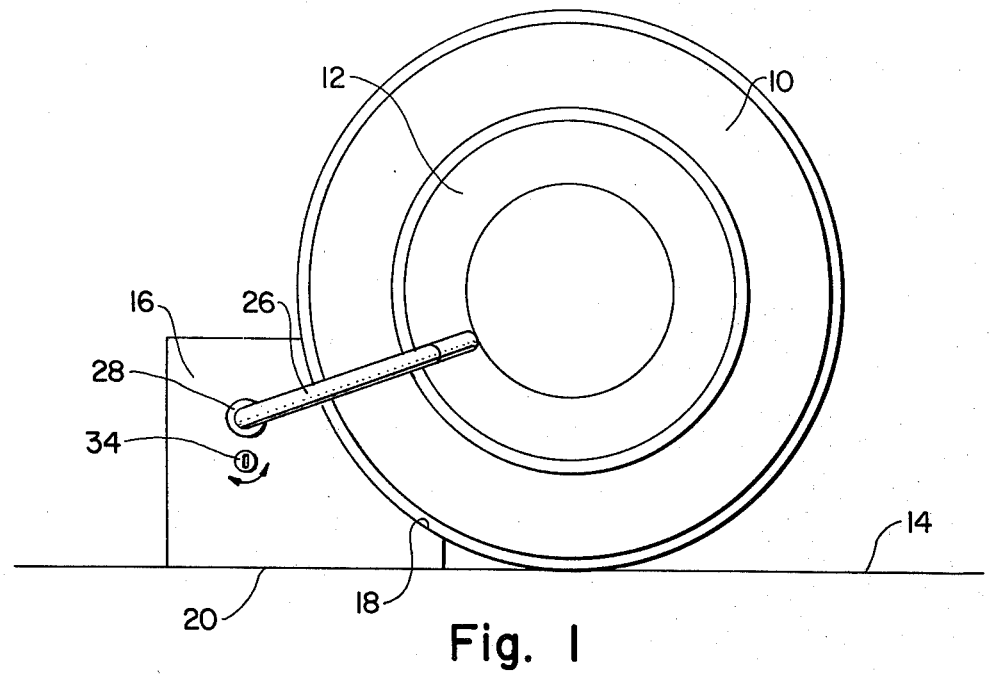
FIG. 1 shows a side view of the invention.

FIG. 1 shows a tire 10 mounted on a rim 12 and resting on a road 14. A chock can be made of metal such as aluminum block 16 which has an arcuate surface 18 for engaging the perifery of tire 10. Another surface 20 is flat for engaging rod 14. As disclosed in FIG. 2, an in and out stationary U-shaped arm 22 is rotatably mounted on block 16 by collar 24. This arm 22 goes partially around the tire 10. Similarly, another U-shaped arm 26 is also rotatably mounted to block 16 by a collar 28 and partially encloses tire 10. However, arm 26 is in and out adjustable for adapting to various tire sizes. Both arms 22 and 26 are preferably made of metal such as aluminum. Arm 26 has an inner rachet surface 30 for receiving a pawl 32. Tamper proof lock 34 controls the disengagement of pawl 32 from rachet 30, and is in turn controlled by a key 36.

Figure 2:
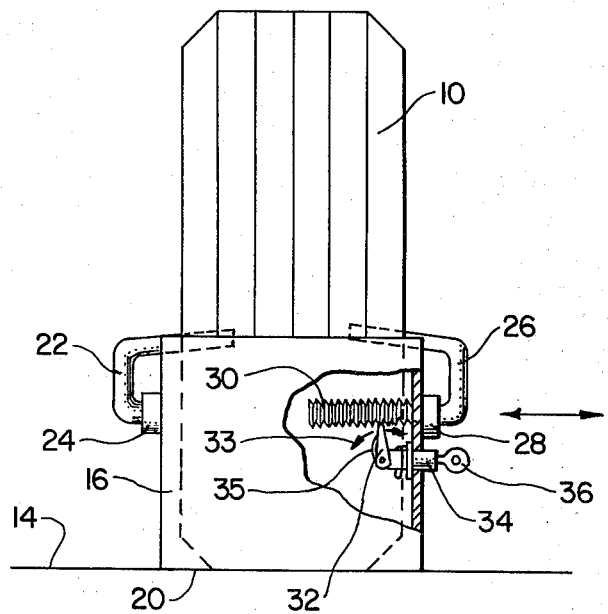
FIG. 2 shows a front view partially exposed to show the inner works.

In operation, block 16 is placed on road 14 abutting tire 10, arcuate surface 18 abutting the tire and arm 22 partially around tire 10. Then arm 26 is slid inwardly so that it partially encloses tire 10 sufficiently so that block 16 cannot be removed from tire 10. Referring to FIG. 2, pawl 32 yields in the direction of arrow 33 upon insertion of arm 26 and is returned to its upright "locked" position by flat spring 35, pawl 32 being limited in clockwise motion to prevent removal of arm 26. Insertion of key 36 will allow rotation of chock 34 and thusly disengaging pawl 32 from rachet 30 allowing removal of arm 26. Thus arm 26 is securely around tire 10. If someone tries to move the transport of which tire 10 is a part, a large racket will ensure, thereby immediately notifying persons in the vicinity that a theft is being committed.

It is appreciated that many other embodiments are possible without departing from the spirit and scope of the invention.

Having thus described the invention, what is claimed as new is:

1. A device for immobilizing a wheeled transport comprising a hollow wheel chock, a first arm means mounted on said chock for engaging said wheel, a second arm means mounted on said chock for engaging said wheel, and means within said chock for locking said second arm means into engaging position with said wheel; whereby said chock protects said locking means from tampering.

2. A device as claimed in claim 1 wherein said chock comprises an arcuate surface for engaging said wheel and a flat surface for engaging the road.

3. A device as claimed in claim 1 wherein said second arm means is adjustably mounted on said chock, whereby different sized wheels can be engaged.

4. A device as claimed in claim 1 wherein said locking means comprises a key operated lock.

5. A device as claimed in claim 1 wherein both of said arm means are U-shaped.

6. A device as claimed in claim 1 wherein said second arm means comprises a rachet portion and said locking means comprises a pawl means for engaging said rachet portion.

7. A device as claimed in claim 1 wherein both of said arms comprise metal.

8. A device as claimed in claim 1 wherein said block comprises metal.

9. A device as claimed in claim 4 wherein said lock is tamper proof.

* * * * *